(12) United States Patent
Frick

(10) Patent No.: US 6,896,132 B1
(45) Date of Patent: May 24, 2005

(54) STORAGE MEDIA CASE

(76) Inventor: Markus W. Frick, 1001 S. Meadows Pkwy., Suite 336, Reno, NV (US) 80511

( * ) Notice: Subject to any disclaimer, the term of this patent is extended or adjusted under 35 U.S.C. 154(b) by 208 days.

(21) Appl. No.: 10/108,172

(22) Filed: Mar. 27, 2002

Related U.S. Application Data

(60) Provisional application No. 60/279,963, filed on Mar. 29, 2001.

(51) Int. Cl.$^7$ .............................................. B65D 85/57
(52) U.S. Cl. .................................. 206/308.1; 220/841
(58) Field of Search ......................... 206/308.1, 308.3, 206/309–313, 493, 425; 220/810, 841, 842, 220/843, 844, 847, 848; 211/41.12

(56) References Cited

U.S. PATENT DOCUMENTS

| | | |
|---|---|---|
| 3,095,965 A | 7/1963 | Stahl et al. |
| 3,836,222 A | 9/1974 | Kuntze |
| 3,951,264 A | 4/1976 | Heidecker et al. |
| 4,164,782 A | 8/1979 | Stewart |
| 4,463,849 A | 8/1984 | Prusak et al. |
| 4,493,417 A | 1/1985 | Ackeret |
| 4,702,369 A | 10/1987 | Philosophe |
| 4,722,034 A | 1/1988 | Ackeret |
| 4,793,480 A | 12/1988 | Gelardi et al. |
| 5,022,529 A | 6/1991 | Kang |
| 5,249,677 A | 10/1993 | Lim |
| 5,310,053 A | 5/1994 | Lowry et al. |
| 5,322,162 A | 6/1994 | Melk |
| 5,360,107 A | 11/1994 | Chasin et al. |
| 5,363,960 A | 11/1994 | Ackeret |
| 5,366,073 A | 11/1994 | Turrentine et al. |
| 5,379,890 A | 1/1995 | Mahler |
| 5,427,236 A | 6/1995 | Kramer |
| 5,542,531 A | 8/1996 | Yeung |

(Continued)

FOREIGN PATENT DOCUMENTS

EP    0 160 605 A1    11/1985

(Continued)

OTHER PUBLICATIONS

"Music Firms Try Out 'Green' CD Boxes", M. Cox, Wall Street Journal, Marketplace, Jul./Aug. 1991, p. B9.

Primary Examiner—Shian T. Luong
(74) Attorney, Agent, or Firm—Brown & Michaels, PC

(57) ABSTRACT

This storage media case has a base formed with a bottom wall sized and shaped to receive a disc and with peripheral rim walls further defining the disc-receiving portion of the base. Its lid is provided with its own set of rim walls that overlap the rim walls on the base when the lid is closed and thereby help to protect the disc from invasive contact. Mating hinge assemblies are formed at the back of both the base and lid. These assemblies allow the hinge elements to be snapped together with the lid registered over the base. The geometry of the base hinge assembly allows expansion room for the hinge clevis members on the lid to spread apart and snap over the hinge pins only when the lid is registered in a nearly closed position over the base. When the lid is opened, its hinge devises move down into narrower recesses in the base so that the base prevents the hinge devises from spreading.

17 Claims, 11 Drawing Sheets

U.S. PATENT DOCUMENTS

| | | | |
|---|---|---|---|
| 5,573,120 A | 11/1996 | Kaufman et al. | |
| 5,590,768 A | 1/1997 | Hilton et al. | |
| 5,590,769 A | 1/1997 | Lin | |
| 5,593,031 A | 1/1997 | Uchida | |
| 5,593,032 A * | 1/1997 | Staley | 206/309 |
| 5,657,893 A | 8/1997 | Hitchings | |
| 5,682,989 A | 11/1997 | Taniyama | |
| 5,682,991 A | 11/1997 | Lammerant et al. | |
| 5,697,498 A | 12/1997 | Weisburn et al. | |
| 5,706,938 A * | 1/1998 | Niehaus | 206/308.1 |
| 5,713,461 A * | 2/1998 | Su | 206/303 |
| 5,746,314 A | 5/1998 | Knutsen et al. | |
| 5,813,525 A * | 9/1998 | McQueeny | 206/308.1 |
| 5,839,576 A | 11/1998 | Kim | |
| 5,881,872 A | 3/1999 | Frick | |
| 5,882,748 A * | 3/1999 | Tomoda | 428/35.2 |
| 5,924,564 A * | 7/1999 | Lin | 206/308.1 |
| 5,996,785 A * | 12/1999 | Palmer et al. | 206/308.1 |
| 6,000,576 A * | 12/1999 | Liu | 220/826 |
| 6,070,749 A * | 6/2000 | Joulia | 220/4.22 |
| 6,193,061 B1 * | 2/2001 | Lew et al. | 206/308.1 |
| 6,395,234 B1 * | 5/2002 | Hunnell et al. | 422/101 |

FOREIGN PATENT DOCUMENTS

| | | |
|---|---|---|
| GB | 2 143 210 A | 2/1985 |
| GB | 2 208 849 A | 4/1989 |
| WO | WO 92/22903 A1 | 12/1992 |

* cited by examiner

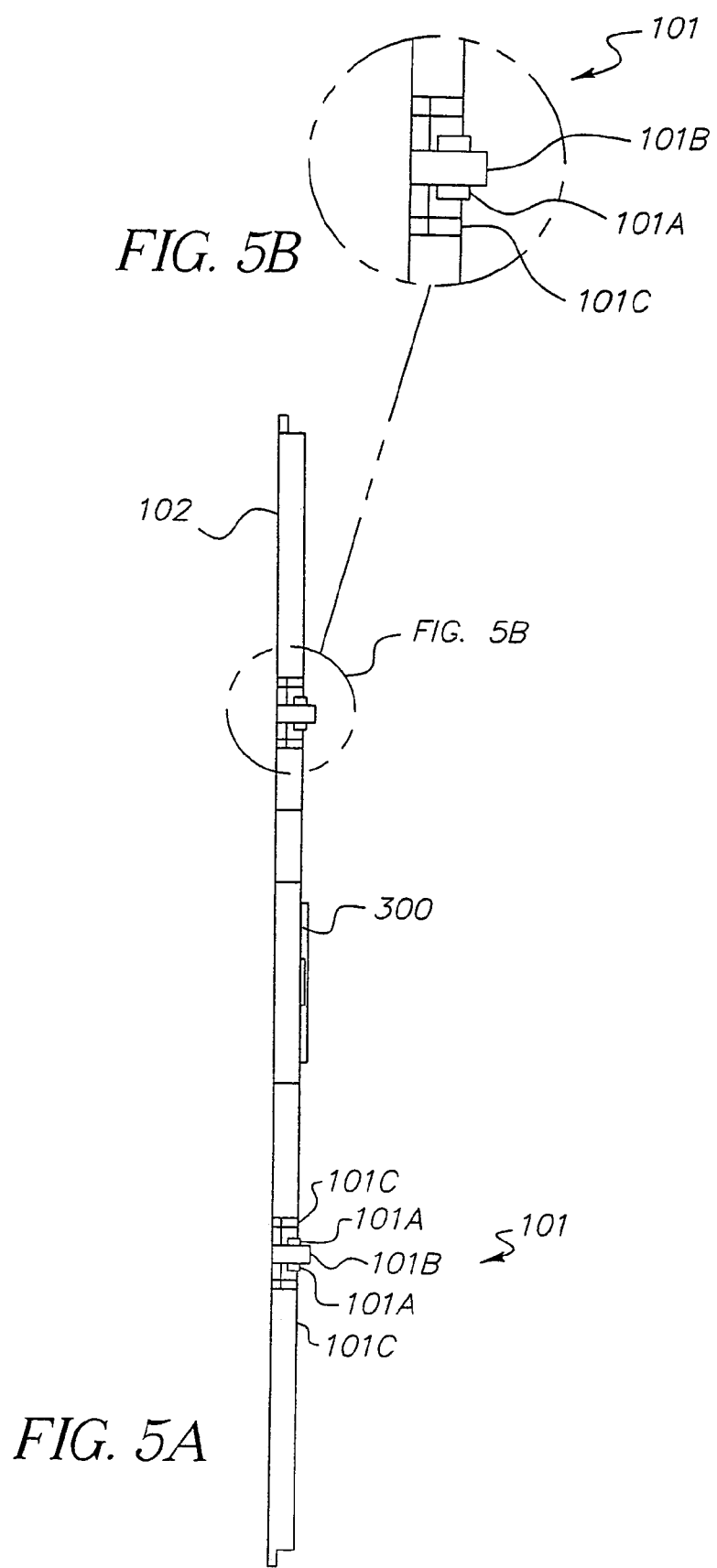

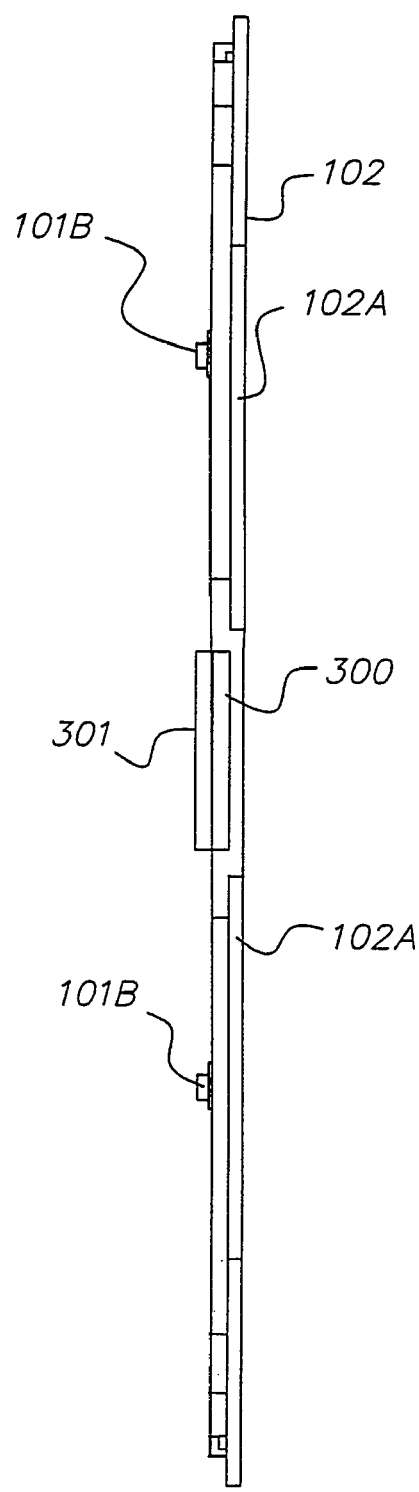
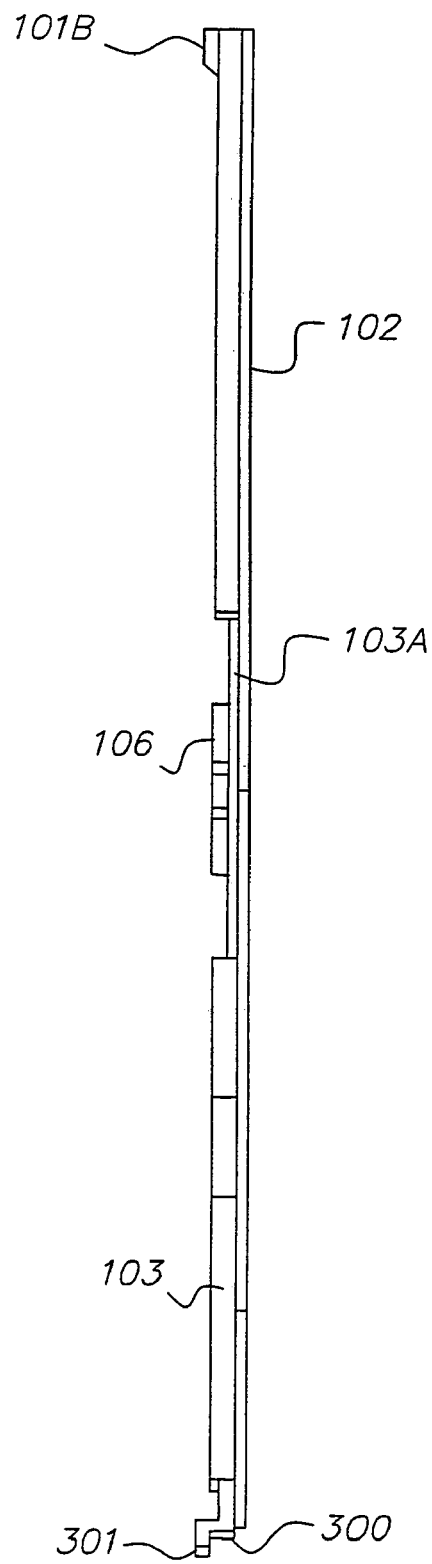
FIG. 6
FIG. 7

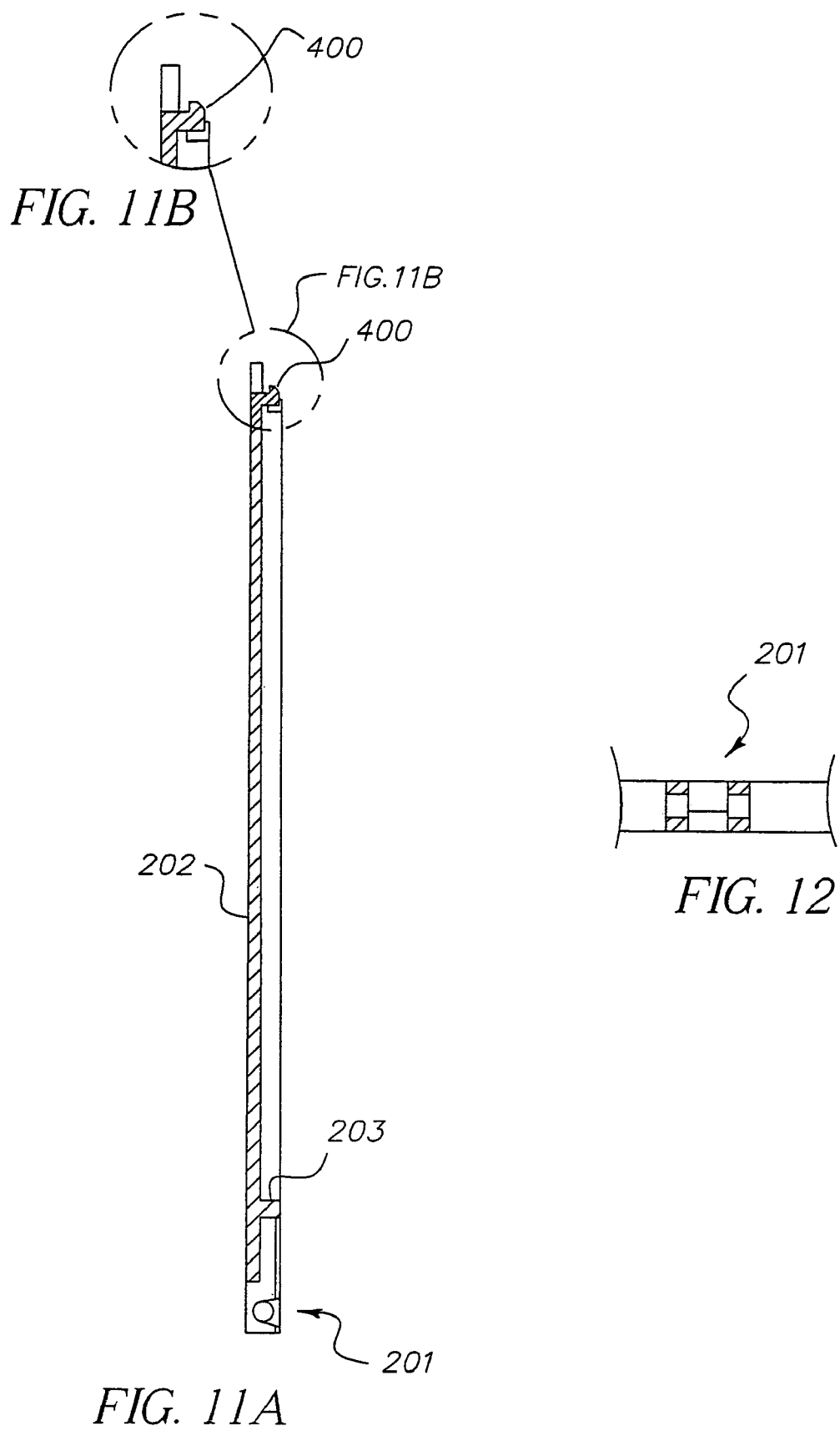

STORAGE MEDIA CASE

This application claims the benefit of U.S. Provisional Application No. 60/279,963, filed on 29 Mar. 2001, which Provisional application is incorporated by reference herein.

TECHNICAL FIELD

The invention relates to the field of packaging for storage media, especially disc-shaped storage media. The invention particularly relates to packaging for optical discs, such as compact discs (CDs) and digital video discs (DVDs— also called "digital versatile discs"), commonly referred to as "jewel boxes" or "jewel cases".

BACKGROUND OF THE INVENTION

Prior art storage media packages, such as jewel boxes for audio CDs and CD-ROMs, have suffered a number of disadvantages. (I will refer to CDs in this specification, but the discussion of the prior art and the invention also applies to other disc-shaped records and storage media in general.) These problems create a substantial need for a jewel box having a base and lid that can be mated/assembled around a disc with the types of standard equipment used industry-wide, while weighing less and being sturdier, less complex, less bulky, and less expensive.

The standard jewel box is relatively complex given its basic role as a protective storage case. It is comprised not only of a lid pivotally connected to a base as would be expected, but it also includes a tray with a disc carrier. The tray is typically held in the base by a press or snap-in fit and includes a raised cylindrical portion that spaces the recorded surface of the stored disc from the tray itself. A set of raised, radially arranged fingers formed on the raised cylindrical portion hold the disc in place by an interference fit with the center hole of the disc.

The standard jewel box is also relatively fragile. The types of hard plastics generally utilized in the construction of jewel boxes are easily cracked and broken. This leads to a protective case that can easily lose its serviceability. It also leads to special problems related to the hinges used to join the lid to the base of the jewel box. The lid typically has extensions with protrusions that fit into holes on the base to provide a pivot connection. However, these extensions snap off easily, and the protrusions often pop out of the holes into which they are inserted. The integrity of the standard jewel box is, therefore, easily compromised.

Finally, the complexity and materials used in constructing jewel boxes increase manufacturing costs. The resulting jewel boxes are relatively heavy and bulky (approximately ¼ inch thick), making them more cumbersome and inconvenient when storing large numbers of discs. This also greatly limits their usefulness and economy as a case and protector for mass shipments of discs. Thus, when making mass disc mailings, such as those currently undertaken in the marketing of internet services, standard jewel boxes are not used. Instead, discs are generally wrapped in plastic and placed in cardboard mailing envelopes that do not offer the degree of protection desired.

In view of the foregoing facts, a great need exists for a jewel box that will overcome the deficiencies in prior art jewel box construction. However, ubiquitous use of the current jewel box has led to standardization of the equipment used to place a disc in the base of a jewel box and join a lid to the base so that it covers the disc. Manufacturers have made a large investment in this automated equipment for assembly and packaging of standard jewel boxes. Any new jewel box design that would require different automated equipment is unlikely to succeed in the marketplace. Thus, an improved jewel box must also be capable of use with the automated assembly equipment currently utilized by manufacturers.

SUMMARY OF THE INVENTION

The hinged jewel case of my invention is totally compatible with the automatic equipment used to load a case with a disc. Moreover, my case is simple in overall construction, formed from durable materials, lightweight, less expensive to manufacture than current boxes, and sized for mass mailings and provides the protection offered by current jewel boxes while being less cumbersome and heavy.

My invention has a base portion formed with a bottom wall sized and shaped to receive a disc and with peripheral rim walls further defining the disc-receiving portion of the base. Portions of the bottom wall extend behind the disc-receiving portion of the base. These bottom wall portions have holes that are spaced apart in a manner that allows the base (with its attendant lid) to fit into a binder for storage purposes or to be hung on pegs for retail marketing purposes. The holes can also serve as indexing holes to locate the base accurately for assembly. The center of the disc-receiving portion has a set of raised, radially arranged fingers formed to hold the disc in place by an interference fit with the center hole of the disc as is known in the art. The lid is provided with its own set of rim walls that overlap the rim walls on the base when the lid is closed and thereby help to protect the disc enclosed in my invention from dirt and other invasive contact. Further, my improved jewel case is formed from component parts (i.e.-lid and base) that are thin, flat, and stackable for storage and manufacturing convenience. It is further designed to have these same features when assembled as well as being light, durable, and easily mailable.

Most importantly, the hinge design of my invention allows it to be assembled around a disc using standard techniques and equipment. Mating hinge assemblies are formed at the back of both the base and lid. These assemblies allow the hinge elements to be snapped together with the lid registered over the base. This is very important as it accommodates the equipment used in packing discs. Thus, in my invention, a disc can be dropped into the base and the lid can then be brought down over the base and snapped into place as is required by the types of standardized automated equipment used in the industry. The geometry of the base hinge assembly accommodates this by allowing expansion room for the hinge clevis members on the lid to spread apart and snap over the hinge pins. The clearance affordable is available only when the lid is registered in the nearly closed position over the base. When the cover is opened, its hinge devises move down into narrower recesses in the base so that the base prevents those hinge devises from opening. This occurs after the lid has been opened only a few degrees. The hinge pins are under the most stress when the lid is opened, so my hinge has been designed to be strongest when the cover is open. Conversely, the hinge is somewhat weaker when the lid is closed. However, this does not impose any great handicap, as the lid does not apply stress to the hinge pins in the closed position.

I prefer to form my improved jewel case from resinous materials, such as plastics, for economy and ease of manufacture. Additionally, I prefer to use plastics recycled from consumer waste, such as beverage containers, to reduce pollution of the environment. Recognizing that the use of such materials results in an increase in manufacturing cost, I also provide for the use of other materials as well.

DESCRIPTION OF THE DRAWINGS

FIG. 5A provides a rear edge view of the base and its hinge assemblies.

FIG. 5B provides a more detailed rear edge view of the base hinge assemblies illustrated in FIG. 5A.

FIG. 6 provides a front edge view of the base of my invention.

FIG. 7 provides a side edge view of the base of my invention.

FIG. 11A provides a cross-sectional view taken through line 11A—11A of FIG. 9.

FIG. 11B provides a more detailed cross-sectional view of the latch assembly illustrated in FIG. 11A.

FIG. 12 provides a cross-sectional view taken through line 12—12 of FIG. 9.

DESCRIPTION OF THE INVENTION

Figure 1:
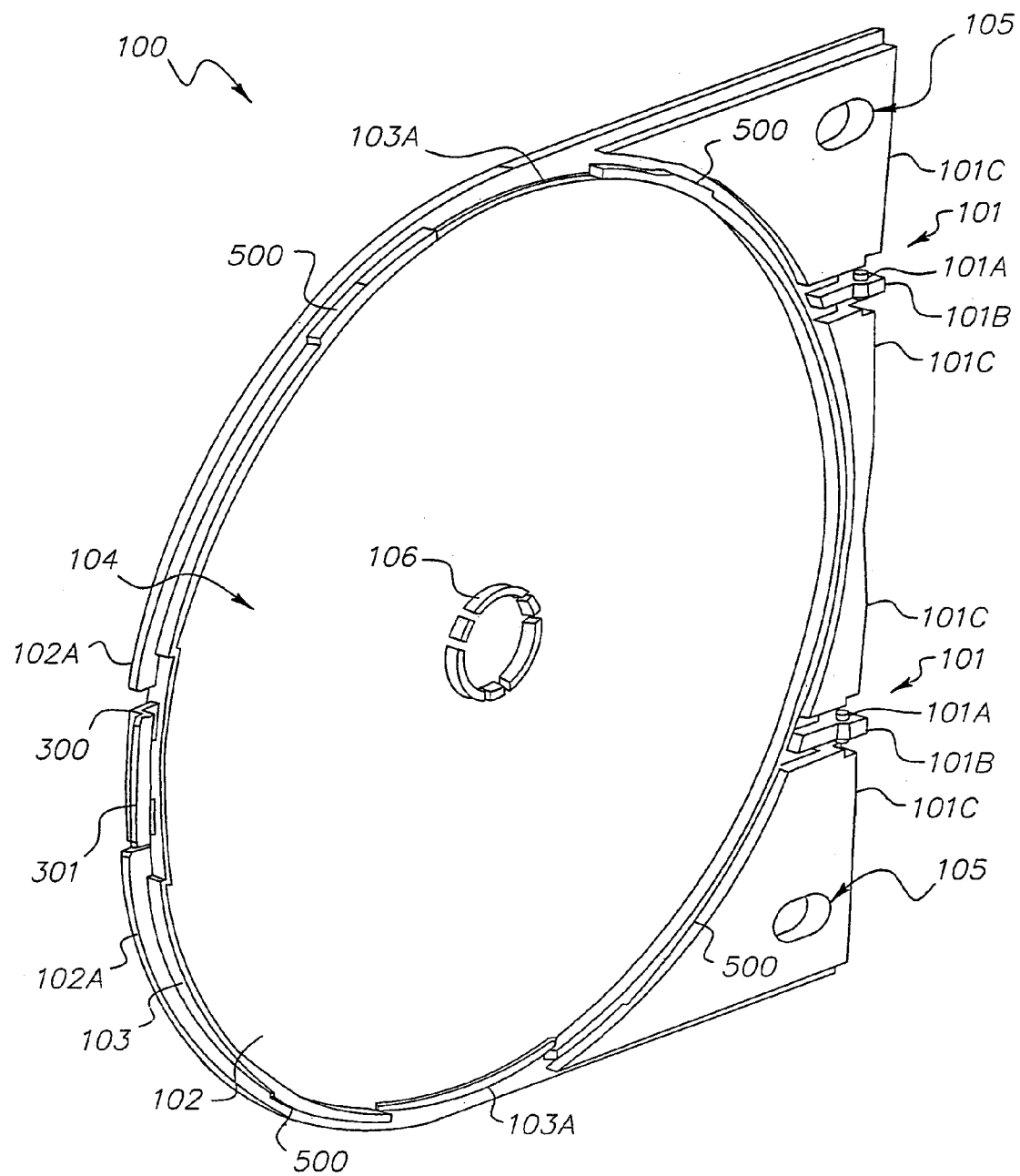
FIG. 1 provides a perspective view of the base of a preferred embodiment of my invention.
Figure 2:
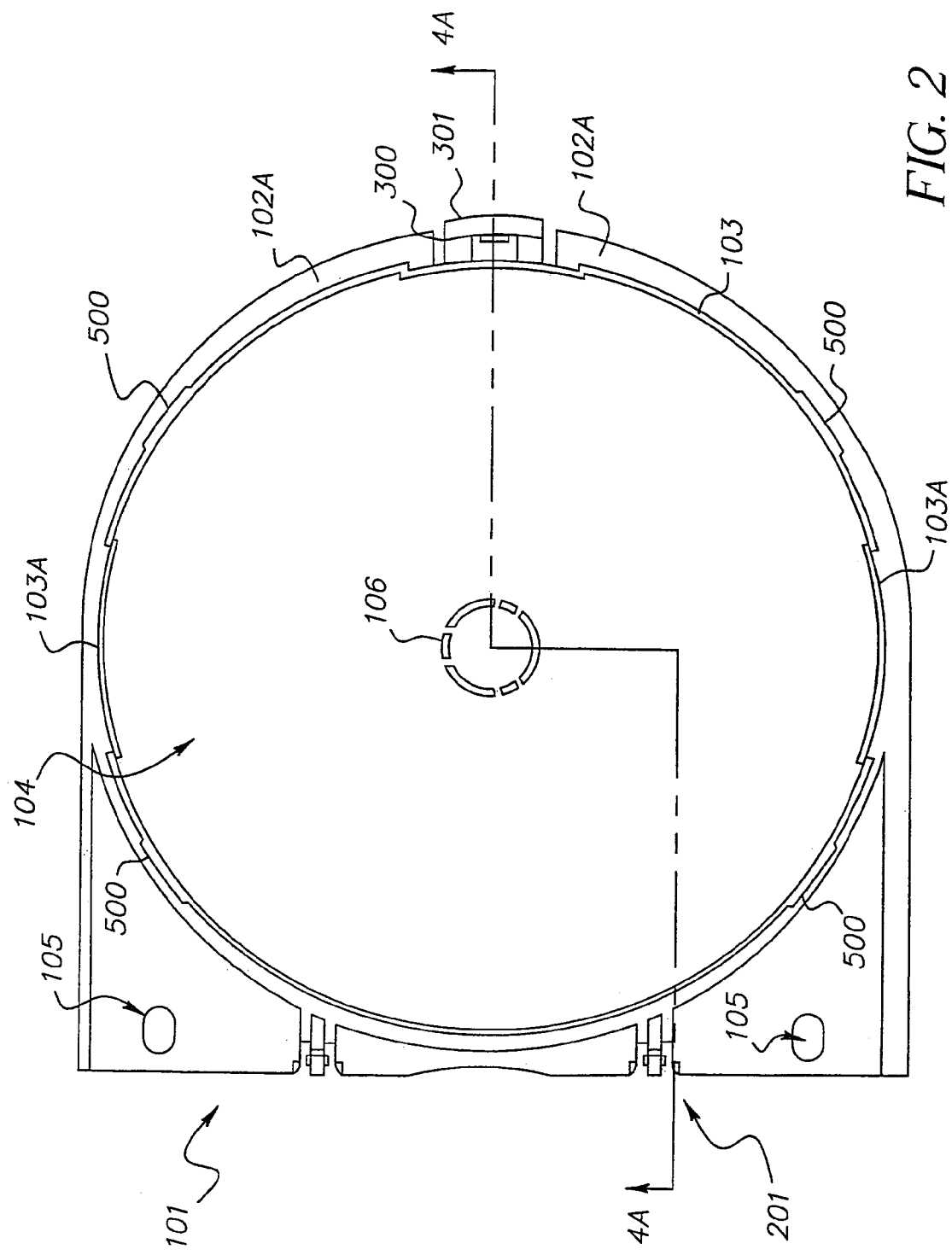
FIG. 2 provides a view from above of the base of my invention.
Figure 3:
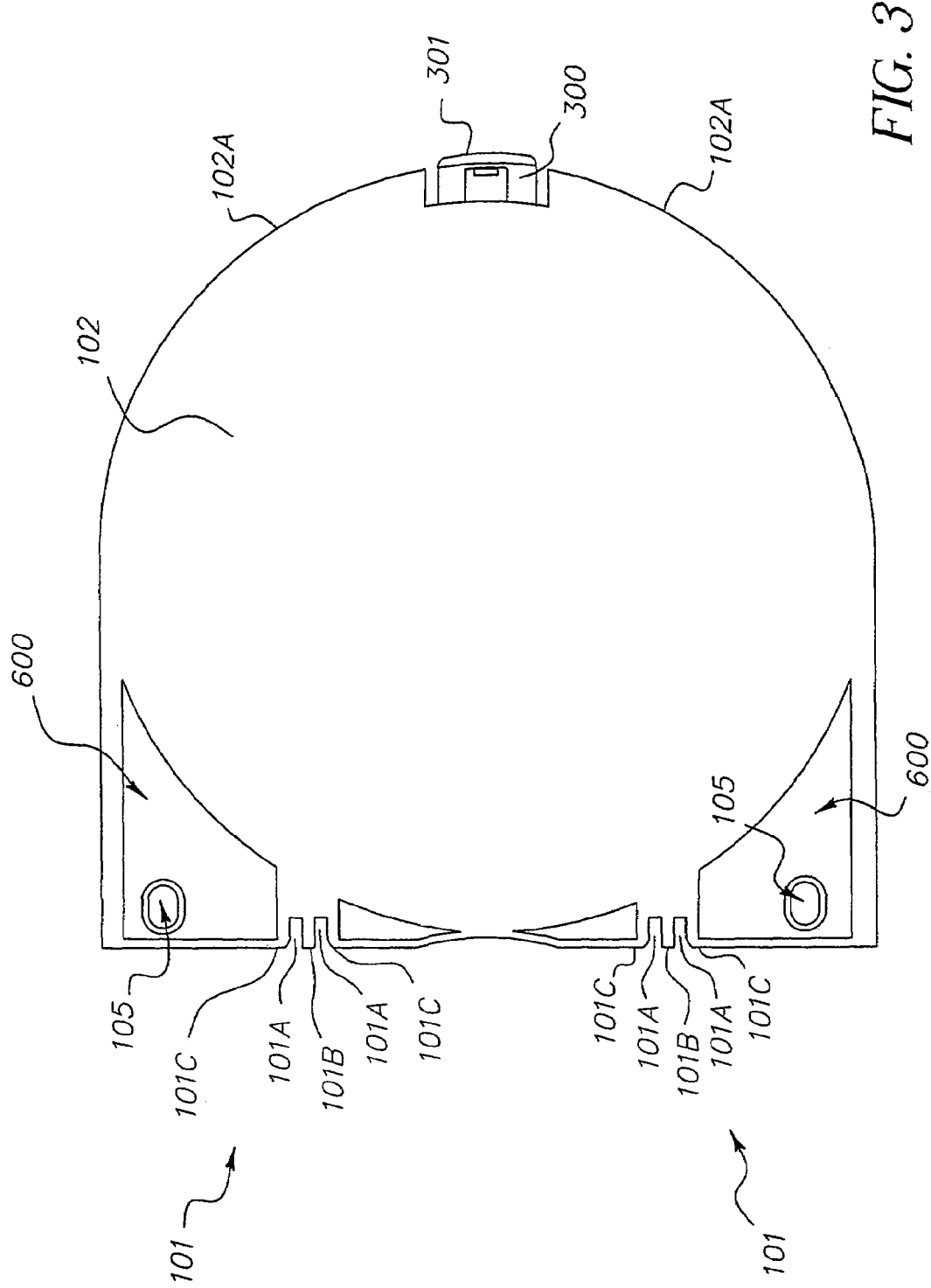
FIG. 3 provides a view from below of the base of my invention.
Figure 4B:
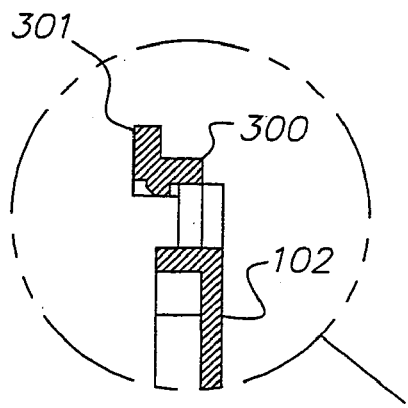
FIG. 4B provides a more detailed cross-sectional view of the latch assembly illustrated in FIG. 4A.
Figure 4A:
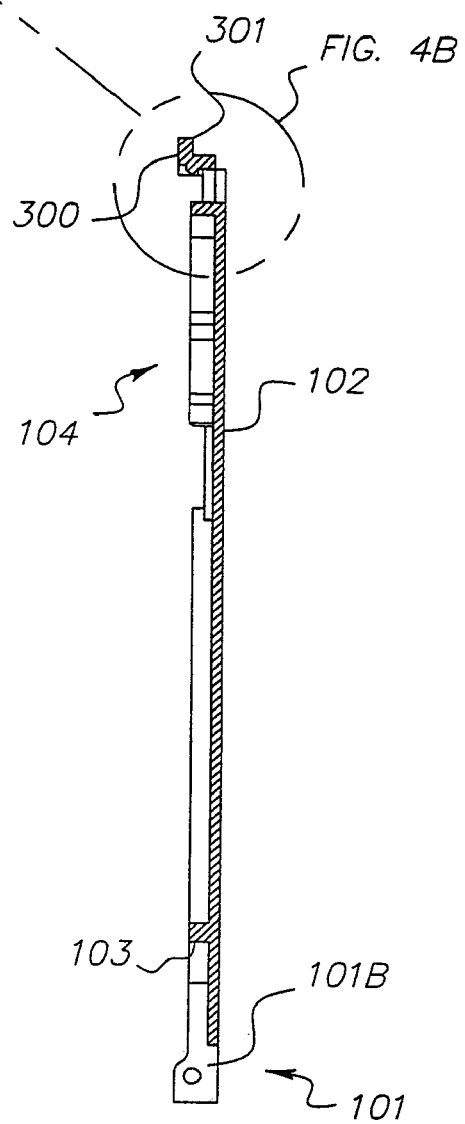
FIG. 4A provides a cross-sectional view taken through line 4A—4A of FIG. 2.
Figure 8:
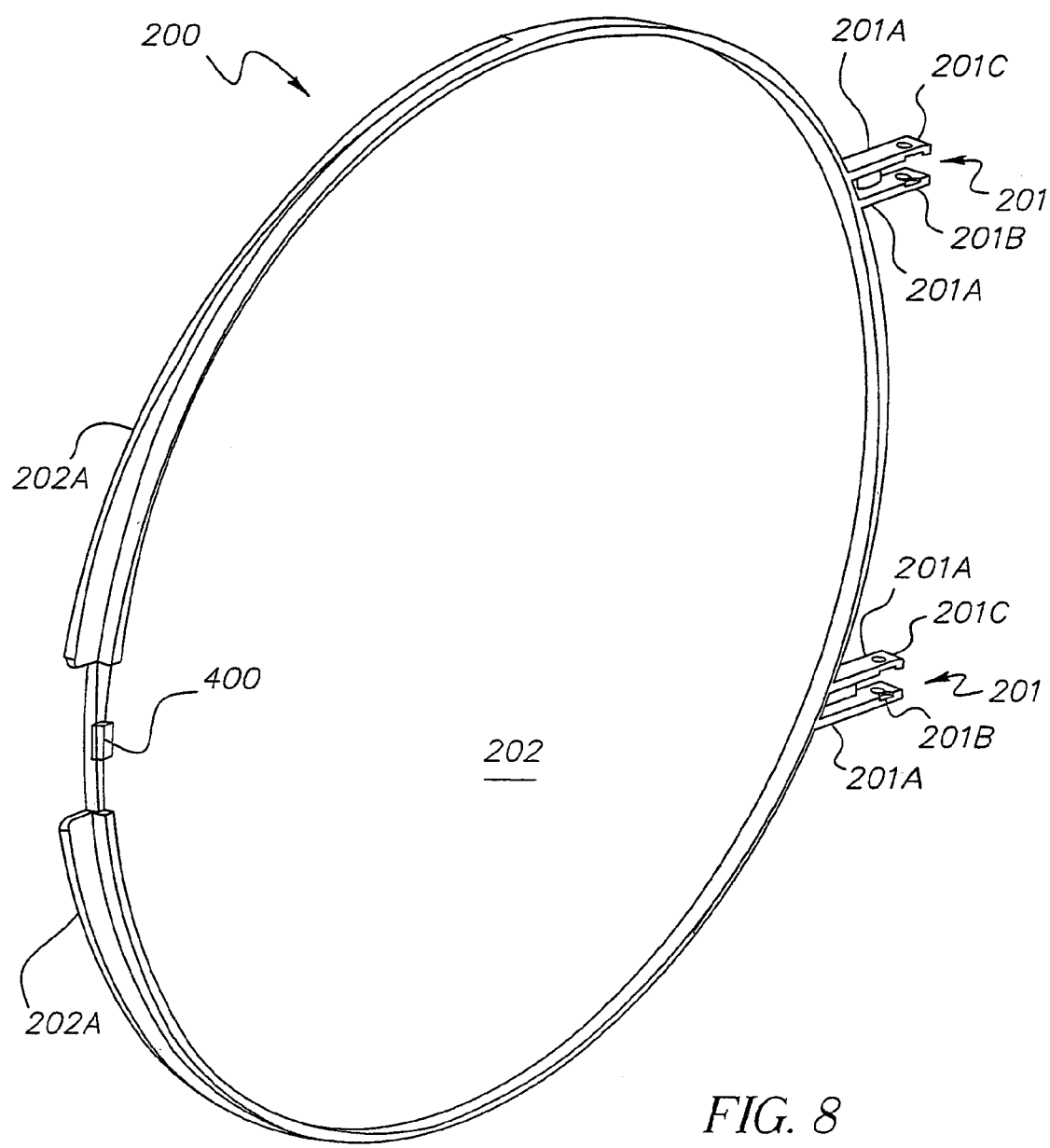
FIG. 8 provides a perspective view of the lid of my invention.
Figure 9:
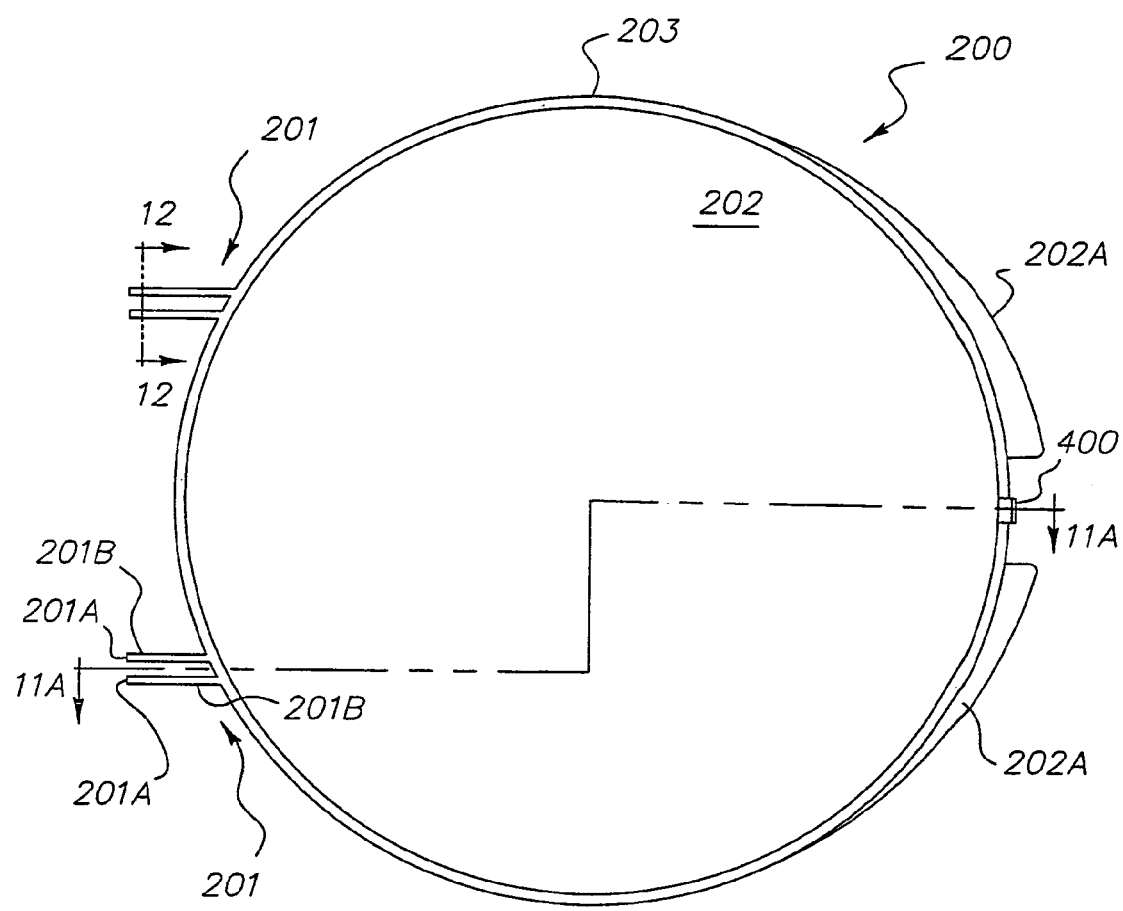
FIG. 9 provides a view from below of the lid of my invention.
Figure 10:
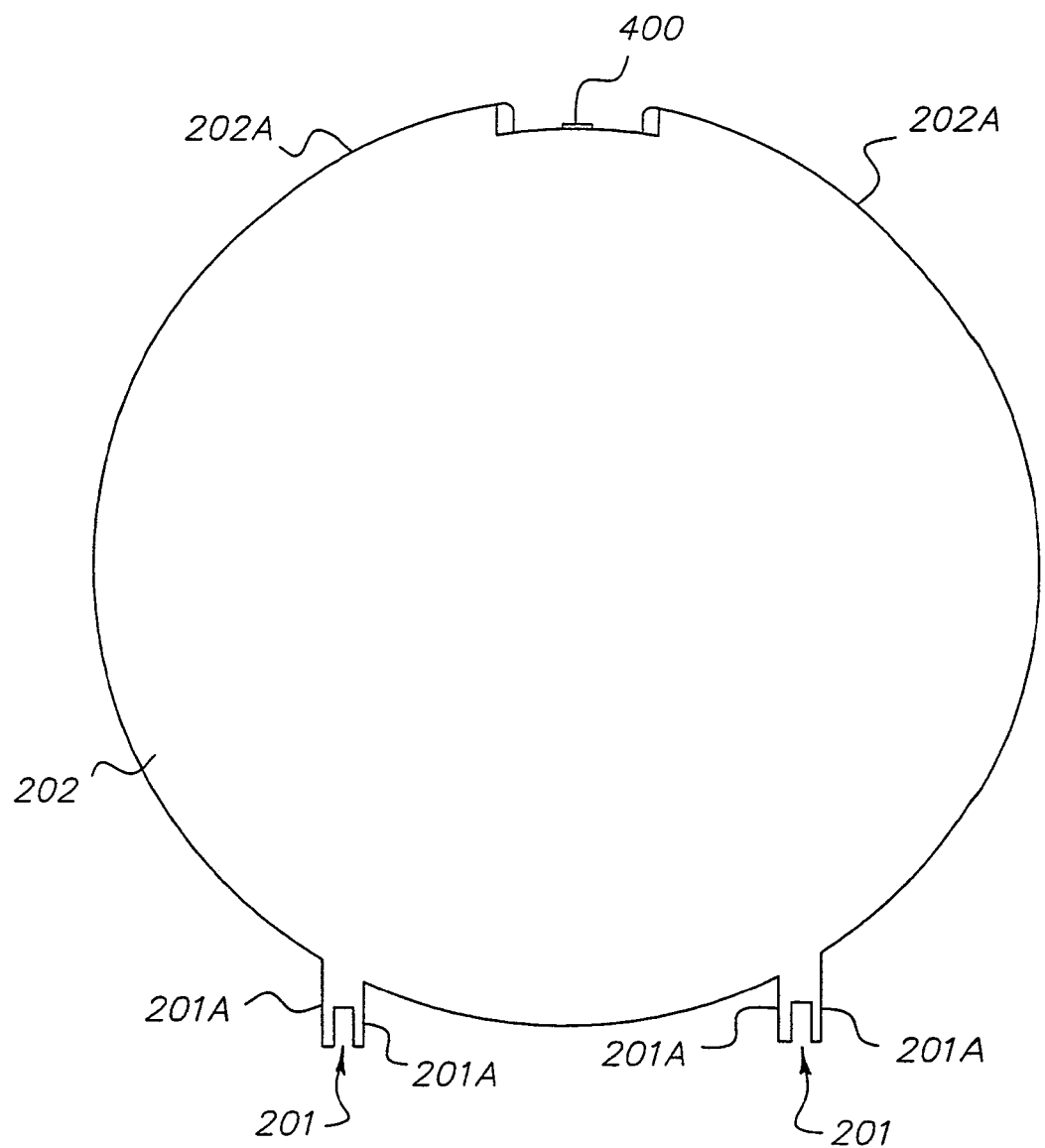
FIG. 10 provides a view from above of the lid of my invention.
Figure 13:
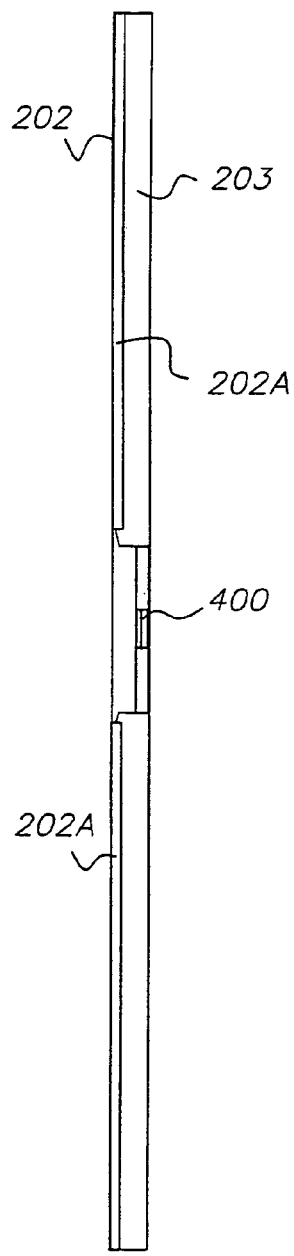
FIG. 13 provides a front edge view of the lid of my invention.
Figure 14:
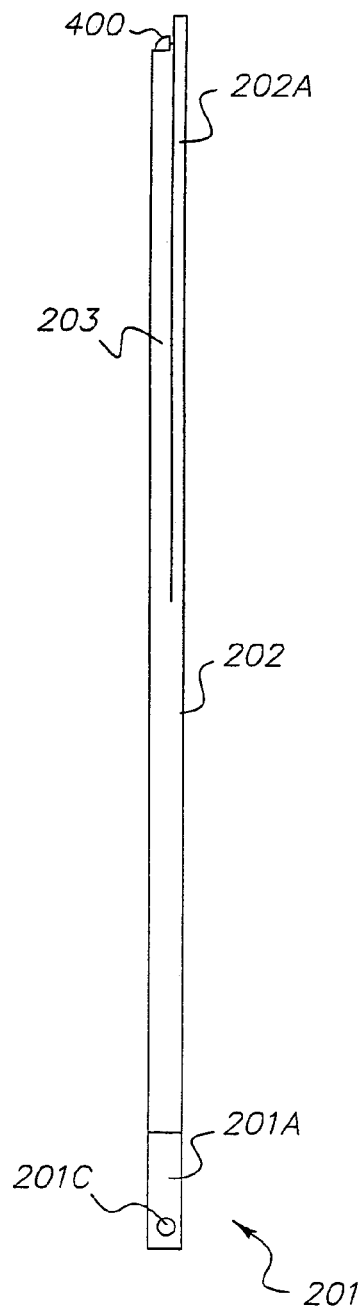
FIG. 14 provides a side edge view of the lid of my invention.
Figure 15:
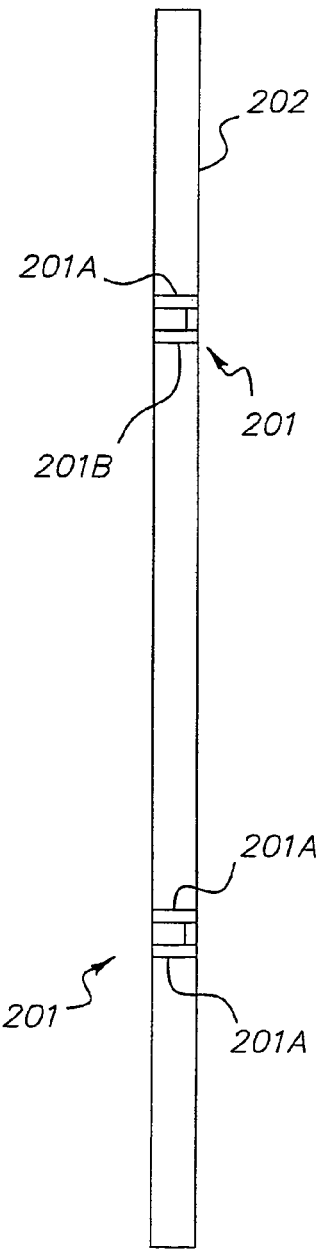
FIG. 15 provides a rear edge view of the lid and its hinge assemblies.

Examples of embodiments of my invention are shown in the accompanying drawing figures. I will describe the improved jewel case of my invention in the context of packages for disc-shaped storage media ("discs"), such as CDs and DVDs; but my invention can be used for packaging and storing other types of storage media, including CD business cards, Mini-CDs, and Die Cut CDs. My case has, and is formed by joining, only two major components: a base (denoted generally by arrow 100) and a lid (denoted generally by arrow 200).

The base 100 is formed with a bottom wall 102 sized and shaped to receive a disc and with peripheral bottom rim walls 103 further defining its disc-receiving portion (denoted generally by arrow 104). The lid 200 is formed with a top wall 202 and with its own set of top rim walls 203 that overlap the bottom rim walls 103 of the base 100 when the lid 200 is closed. This helps to protect the disc enclosed in my invention from dirt and other invasive contact, particularly when the lid 200 is closed. The bottom rim walls 103 have lowered portions 103A on opposing sides. These lowered portions provide the protection required, while still allowing the user to conveniently insert his or her fingers under a disc held in my jewel case when removing the disc. The center of the disc-receiving portion 104 has a set of raised, radially arranged fingers 106 formed to hold a disc in place in the disc-receiving portion 104 via an interference fit with the center hole of the disc.

Portions of the bottom wall 102 extend rearward behind the disc-receiving portion 103. These portions have reinforced holes 105 that are sized and spaced apart approximately 8.5 cm. This spacing allows the base 100 to fit into a 3-ring binder for storage purposes and to be placed in appropriately sized ROLODEX type units. Further, retail sales often involve the use of pegboard with mounting pegs for the mounting and display of items to be sold. Thus, the holes provided allow my jewel case to be conveniently hung for display purposes. Holes 105 can also serve as indexing holes to locate the base 100 accurately for assembly.

The base 100 has two base hinge assemblies 101 by which it can be joined to the lid 200 via two mating lid hinge assemblies 201. These hinge assemblies are spaced inward of holes 105 so as to allow my jewel case to be opened even when placed in a binder. Base hinge assemblies 101 and lid hinge assemblies 201 can be snapped together with the lid registered over the base. However, they cannot be easily snapped together (or detached) if oriented in any other manner. The lid hinge clevis members 201A of each lid hinge assembly 201 have a beveled section 201B that allows the ramping of the pins 101A into the pin holes 201C provided in clevis members 201A when the lid 200 is lowered onto the base 100 from above. The beveling of the clevis members 201A in this way facilitates the joining of hinge assemblies 101 and 201. However, spreading of the clevis members 201A still takes place as they are forced apart by pins 101A. The structure of the hinge assemblies 101 and 102 (particularly the notched portions of interference edges 101C) allows this spreading only when the lid 200 is registered in the nearly closed position over the base 100. When the lid 200 is opened further, the portion of clevis members 201A to the rear of pin holes 201C is pivoted downward into narrower recesses between interference edges 101C, preventing the spreading of clevis members 201A. This occurs after the lid has been opened only a few degrees.

The pins 101A of my invention are formed as part of a "T" bar extension 101B. Instead of the usual one pin for each hinge, my invention features two. This helps to prevent separation of the hinge assemblies. In the usual hinge assemblies for jewel cases, lateral movement of the lid with respect to the base can serve to detach one of the hinge pins. The other then comes free immediately, as it is no longer blocked from lateral movement in the opposite direction. However, with my hinge arrangement, movement in a lateral direction is not only blocked by the "T" bar extension 101B and interference edges 101C, it merely serves to drive the pins 101A extending in that lateral direction even more strongly and directly into their respective pin holes 201C. Thus, my unique dual pin hinge design with interference edges 101C is extremely useful in assuring the structural integrity of my jewel case.

The protective and structural integrity of my jewel case is further safeguarded by the design of the front latch assembly formed from bottom latch 300 and top catch 400. The bottom latch 300 has a finger tab 301 for leverage on its front edge and is connected to bottom rim wall 103 rather than to bottom wall 102. The extra height above the bottom of the jewel box gained by connecting bottom latch 300 above bottom rim wall 103 allows the user to press bottom latch 300 downward via finger tab 301 sufficiently to disengage from top catch 400 even while my improved jewel box is sitting flat on a surface. Further, top wall extensions 202A as well as bottom wall extensions 102A are provided on either side of the front latch assembly and extend outward approximately as far as finger tab 301. These extensions provide a convenient point of contact and leverage for the user's fingers adjacent the latch assembly for use in closing or unlatching my jewel box. However, even more importantly, these extensions provide sets of "bumpers" flanking the latch assembly on either side. This protects my jewel box from accidental opening, even when dropped directly onto its front latch assembly.

The firm closure and structural integrity of my jewel box when closed is protected not just by its hinge and latch assemblies at front and back, it also has four paired friction-locking areas 500. Friction-locking areas 500 are formed on opposite sides of my jewel box by increasing the thickness of top rim walls 203 and/or bottom rim walls 103 in these areas so as to form a resistance fit. This resistance fit helps to keep my jewel box closed in normal use. It also helps to avoid the unsightly deformation, waffling, or warping of my jewel box that could occur due to its exposure to heat when, e.g., left in an automobile in summer.

The shape and design of my improved jewel case is well adapted for commercial and manufacturing purposes. The outer surfaces of bottom wall 102 and top wall 202 provide flat surfaces that are well adapted for use in labeling or decorating my improved jewel box by pad printing, silk-screening, adhesive labels, or by other means. A totally round case could not be shrink-wrapped without unsightly gathers, folds, and wrinkles. The flat back edge of my case allows the use of shrink-wrap packaging with much greater ease. In addition, both the base 100 and the lid 200 of my jewel case have been planned and designed to have a completely flat profile both individually and when joined to form my invention. Thus, both my jewel case and its component parts can be stacked efficiently for storage, display, shipment, and manufacturing purposes. Finally, indented regions 600 are provided in the underside of the rearward extensions of bottom wall 102. These indented regions are approximately 2 mm in depth. The magnetic media used to guard against theft are typically approximately 1.6 mm thick. Thus, these media can be easily inserted into and unobtrusively positioned within the indented regions provided during the packaging process.

All of the parts of my inventive package are preferably formed from resinous materials, such as plastics, by injection molding. In particular, I prefer to make most of the parts from polypropylene monopolymer or copolymer. It can also be formed from recycled polypropylene, recycled polyethylene terephthalate (PET) derived from beverage bottles, or from recycled polyvinyl chloride (PVC). Using recycled plastics wherever possible, while more expensive, will reduce the amount of plastics deposited in landfills, thereby increasing the useful life of existing landfills and reducing the overall amount of refuse entering our environment.

I claim:

1. A media storage case, comprising:
a base having a back edge with base hinge parts located proximate its back edge;
a lid having a back edge with lid hinge parts located proximate its back edge, which lid hinge parts can be snapped together with said base hinge parts and unsnapped from said base hinge parts only when the lid is in a closed position registered over said base; and
wherein a hinge part includes flexible members that bend to allow base hinge parts and lid hinge parts to snap together when the lid is in a closed position registered over the base, but are blocked from bending when the lid is open.

2. A media storage case as set forth in claim 1, wherein said base has a disc receiving portion defined by a bottom wall with bottom rim walls extending perpendicularly therefrom, said lid has a disc receiving portion defined by a top wall with top rim walls extending perpendicularly therefrom, and the top rim walls overlap the bottom rim walls when an inward face of the lid is adjacent and facing an inward face of the base, serving to protect a disc enclosed in said disc receiving portion from invasive contact.

3. A media storage case as set forth in claim 2 wherein a disc-receiving portion has an integrally formed set of raised radially arranged fingers formed to hold a disc in place by an interference fit with a center hole of the disc.

4. A media storage case as set forth in claim 2 wherein friction locking areas are provided where bottom rim walls abut top rim walls.

5. A media storage case as described in claim 2 wherein said base and said lid have front edges opposite said back edges, a latch and catch are arranged on said front edges so that the base and lid can be fastened together thereby, and front portions of at least one of said bottom wall and said top wall extend outwardly adjacent to said latch and catch.

6. A media storage case as set forth in claim 2, wherein back portions of the bottom wall extend beyond the disc receiving portion proximate the back edge of said base.

7. A media storage case as set forth in claim 6, wherein holes are provided in spaced relationship in said back portion.

8. A media storage case as set forth in claim 7, wherein said holes are spaced and adapted for use in hanging the media storage case for display.

9. A media storage case as set forth in claim 7, wherein said holes are spaced and adapted for use in attaching the media storage case to a binder.

10. A media storage case as set forth in claim 7, wherein said holes are spaced and adapted for use as indexing holes in manufacturing.

11. A media storage case as described in claim 6 wherein provision is made in said back portions for the placement of magnetic media used to guard against theft.

12. A media storage case as set forth in claim 1 wherein a disc-receiving portion of said base has an integrally formed set of raised radially arranged fingers formed to hold a disc in place by an interference fit with a center hole of the disc.

13. A media storage case as described in claim 1,
wherein base hinge parts and lid hinge parts are comprised of mating flexible members and rigid members, where the flexible members are clevis members that bend apart to allow base hinge parts and lid hinge parts to snap together.

14. A media storage case as described in claim 13, wherein the rigid members have opposing pins that fit into pin holes provided in the clevis members when the members are snapped together.

15. A media storage case as described in claim 14, wherein clevis members have beveled sections that allows the ramping of the pins into the pin holes.

16. A media storage case as described in claim 13 wherein ends of the clevis members rotate to a position between interference edges when the lid is opened, preventing the clevis members from bending apart and the lid from coming unsnapped.

17. A media storage case as described in claim 1 wherein said base and said lid have front edges opposite said back edges and a latch and catch are arranged on said front edges so that the base and lid can be fastened together thereby.

* * * * *